United States Patent
Meadows et al.

(10) Patent No.: US 9,309,031 B2
(45) Date of Patent: Apr. 12, 2016

(54) BOTTLE CAP MADE FROM A MATERIAL COMPRISING POLYPROPYLENE, PARTICULATE CALCIUM CARBONATE AND ADDITIVES

(75) Inventors: Grant Robert Meadows, Middlesex (GB); Joe Huesman, Maineville, OH (US); Huberto Miel Dalisay, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 189 days.

(21) Appl. No.: 12/876,764

(22) Filed: Sep. 7, 2010

(65) Prior Publication Data
US 2011/0056906 A1   Mar. 10, 2011

(30) Foreign Application Priority Data
Sep. 7, 2009  (EP) .................................. 09169599

(51) Int. Cl.
| | | |
|---|---|---|
| *B65D 41/00* | (2006.01) | |
| *B29C 45/72* | (2006.01) | |
| *C08K 3/26* | (2006.01) | |
| *B65D 47/08* | (2006.01) | |
| *C08L 23/12* | (2006.01) | |

(52) U.S. Cl.
CPC ...... *B65D 47/0838* (2013.01); *C08K 2003/265* (2013.01); *C08L 23/12* (2013.01)

(58) Field of Classification Search
CPC .............. B65D 47/0838; B29C 45/00; B29C 45/0013; B29C 70/58; B29K 2709/00
USPC ................. 428/34.5, 34.7, 35.7; 264/328.14, 264/328.18; 215/316; 524/427
See application file for complete search history.

(56) References Cited

U.S. PATENT DOCUMENTS

| | | | |
|---|---|---|---|
| 3,700,614 A | | 10/1972 | Schenkerberg |
| 4,244,910 A | * | 1/1981 | Yui et al. .................. 264/328.12 |
| 4,407,986 A | | 10/1983 | Nomura |
| 4,948,665 A | | 8/1990 | Rosen |
| 4,959,189 A | | 9/1990 | Rohrbacher |
| 5,028,461 A | | 7/1991 | Nakamichi |
| 5,124,193 A | | 6/1992 | Sano |
| 5,286,791 A | | 2/1994 | Denicola, Jr. |
| 5,328,058 A | | 7/1994 | Leoncavallo |
| 5,366,805 A | | 11/1994 | Fujiki |
| 5,538,786 A | | 7/1996 | Hurley |
| 5,545,485 A | | 8/1996 | Hashitani |
| 5,744,516 A | | 4/1998 | Hashitani |
| 5,792,807 A | | 8/1998 | Hayashihara |
| 5,795,377 A | | 8/1998 | Tanner |

(Continued)

FOREIGN PATENT DOCUMENTS

| | | |
|---|---|---|
| CA | 1267244 A | 3/1990 |
| CN | 1250787 A | 4/2000 |

(Continued)

*Primary Examiner* — Yan Lan
(74) *Attorney, Agent, or Firm* — James T. Fondriest

(57) ABSTRACT

An injection molded polymeric household bottle cap made of a polypropylene composition comprising: particulate $CaCO_3$; additive; and polypropylene; wherein the polypropylene composition in its solid form and with average wall thickness T has a flexural modulus, measured according to ASTM D790-07, being at least 95% of the flexural modulus measured on a reference polypropylene composition being substantially free of $CaCO_3$ and having average wall thickness of at least T+10%.

16 Claims, 2 Drawing Sheets

(56) References Cited

U.S. PATENT DOCUMENTS

| | | |
|---|---|---|
| 5,830,305 A | 11/1998 | Andersen |
| 5,891,946 A | 4/1999 | Nohara |
| 5,922,379 A | 7/1999 | Wang |
| 5,942,168 A | 8/1999 | Ichikawa |
| 6,090,195 A | 7/2000 | Anderson |
| 6,138,582 A | 10/2000 | Fujii |
| D434,659 S * | 12/2000 | Lonczak et al. ............... D9/449 |
| 6,177,502 B1 | 1/2001 | Hara |
| 6,211,500 B1 | 4/2001 | Cochran |
| 6,303,069 B1 | 10/2001 | Anhalt |
| 6,323,274 B1 | 11/2001 | Di Fiore |
| 6,365,658 B1 | 4/2002 | Kjellqvist |
| 6,403,936 B2 | 6/2002 | Cochran |
| D459,659 S * | 7/2002 | Chung ........................... D9/529 |
| 6,544,609 B1 | 4/2003 | Goldman |
| 6,569,991 B2 | 5/2003 | Nichols |
| 6,610,767 B1 | 8/2003 | Katayama |
| 6,700,106 B2 | 3/2004 | Cochran |
| 6,706,345 B1 | 3/2004 | Yoon |
| 6,733,852 B2 | 5/2004 | Littlejohn |
| 6,821,538 B2 | 11/2004 | Axelrod |
| 6,855,426 B2 | 2/2005 | Yadav |
| 6,861,128 B1 | 3/2005 | Mueller |
| 6,881,937 B2 | 4/2005 | Swiontek |
| 6,923,338 B2 | 8/2005 | Dees |
| 7,001,956 B2 | 2/2006 | Handlin |
| 7,032,773 B2 | 4/2006 | Dees |
| 7,135,122 B2 | 11/2006 | Park |
| 7,264,868 B2 | 9/2007 | Ajbani |
| 7,482,053 B2 | 1/2009 | Swiontek |
| 7,691,305 B2 | 4/2010 | Sutton |
| 7,736,712 B2 | 6/2010 | Ohbi |
| 7,737,206 B2 | 6/2010 | Ouhadi |
| 7,744,993 B2 | 6/2010 | Wu |
| 7,767,283 B2 | 8/2010 | Forsberg |
| 7,858,202 B2 | 12/2010 | Prigandt |
| 8,304,496 B2 | 11/2012 | Weaver |
| 2001/0051693 A1 | 12/2001 | Seo |
| 2003/0060547 A1 | 3/2003 | Chan |
| 2003/0072917 A1 | 4/2003 | Campbell |
| 2004/0030018 A1 | 2/2004 | Wu |
| 2004/0048967 A1 | 3/2004 | Tomomatsu |
| 2004/0180159 A1 * | 9/2004 | Neal et al. .................... 428/35.7 |
| 2005/0006805 A1 | 1/2005 | Sugihara |
| 2005/0029692 A1 | 2/2005 | Abe et al. |
| 2006/0138131 A1 | 6/2006 | Flynn |
| 2006/0229410 A1 | 10/2006 | Wang |
| 2006/0261509 A1 | 11/2006 | Lustiger |
| 2007/0197710 A1 | 8/2007 | Wu |
| 2007/0202314 A1 | 8/2007 | Youn |
| 2007/0299179 A1 | 12/2007 | Tham |
| 2009/0081407 A1 | 3/2009 | Giraud |
| 2011/0057355 A1 | 3/2011 | Meadows |

FOREIGN PATENT DOCUMENTS

| | | |
|---|---|---|
| CN | 1491986 A | 4/2004 |
| CN | 101104294 B | 12/2010 |
| EP | 0342941 A2 | 11/1989 |
| EP | 0709403 A1 | 5/1996 |
| EP | 0934976 A2 | 8/1999 |
| EP | 0841149 B1 | 7/2001 |
| EP | 0687538 B1 | 3/2002 |
| EP | 1289732 A1 | 3/2003 |
| GB | 2428402 A | 1/2007 |
| GB | 2457021 A | 5/2009 |
| JP | 1167049 A | 6/1989 |
| JP | 1228815 A | 9/1989 |
| JP | 1253414 A | 10/1989 |
| JP | 3087213 A | 4/1991 |
| JP | 3222914 A | 10/1991 |
| JP | 4159345 A | 6/1992 |
| JP | 5138736 A | 6/1993 |
| JP | 5170985 A | 7/1993 |
| JP | 5186664 A | 7/1993 |
| JP | 5286097 A | 11/1993 |
| JP | 6329920 A | 11/1994 |
| JP | 8300389 A | 11/1996 |
| JP | 8302121 A | 11/1996 |
| JP | 8302122 A | 11/1996 |
| JP | 8311294 A | 11/1996 |
| JP | 8325434 A | 12/1996 |
| JP | 9066557 A | 3/1997 |
| JP | 10000622 A | 1/1998 |
| JP | 10053679 A | 2/1998 |
| JP | 10053680 A | 2/1998 |
| JP | 10168277 A | 6/1998 |
| JP | 10315230 A | 12/1998 |
| JP | 11060862 A | 3/1999 |
| JP | 11071520 A | 3/1999 |
| JP | 11106652 A | 4/1999 |
| JP | 2000086910 A | 3/2000 |
| JP | 2000265035 A | 9/2000 |
| JP | 2002052564 A | 2/2002 |
| JP | 2002194179 A | 7/2002 |
| JP | 2002307436 A | 10/2002 |
| JP | 2003183460 A | 7/2003 |
| JP | 2003231799 A | 8/2003 |
| JP | 2004001497 A | 1/2004 |
| JP | 2004269761 A | 9/2004 |
| JP | 2005248089 A | 9/2005 |
| JP | 2006077144 A | 3/2006 |
| JP | 2007176133 A | 7/2007 |
| JP | 2007224123 A | 9/2007 |
| WO | 9419172 A1 | 9/1994 |
| WO | 9846491 A1 | 10/1998 |
| WO | 9920449 A1 | 4/1999 |
| WO | 9924232 A1 | 5/1999 |
| WO | 9924478 A1 | 5/1999 |
| WO | 9924479 A1 | 5/1999 |
| WO | 0026103 A1 | 5/2000 |
| WO | 0153159 A1 | 7/2001 |
| WO | 02079606 A1 | 10/2002 |
| WO | 2007011684 A2 | 1/2007 |
| WO | 2007073109 A1 | 6/2007 |
| WO | 2007106965 A2 | 9/2007 |

* cited by examiner

BOTTLE CAP MADE FROM A MATERIAL COMPRISING POLYPROPYLENE, PARTICULATE CALCIUM CARBONATE AND ADDITIVES

FIELD OF THE INVENTION

The present invention relates to an injection moulded, polymeric bottle cap made from a material comprising polypropylene, particulate $CaCO_3$ and additives; such cap material having an improved flexural modulus.

BACKGROUND OF THE INVENTION

Containers, and more specifically bottles, are widely used in the consumer goods industry for packaging various types of fluid products, such as drinks, foodstuffs, laundry and household cleaning products, shampoo and other personal care products. Thermoplastic materials are mostly used for producing these containers. Typical thermoplastic material used for producing containers and bottles include polyvinylchloride (PVC), polyethylene terephthalate (PET), polypropylene (PP), low or high density polyethylene (LDPE or HDPE) and polystyrene (PS).

Such containers, and more specifically bottles, are required to have certain properties. Indeed, such containers need to have very good mechanical strength to withstand, for example, the rigours of transport, storage and use. These rigours include e.g. stacking of bottles on top of each other (topload), vibrations, shaking and other mechanical stresses, additionally temperature fluctuations during transportation, and usual handling stresses, such as being dropped and squeezed during consumer use. Thus, important mechanical properties include resistance to compression and flexion, and temperature fluctuations. However, these containers must have, at the same time, a weight as low as possible in order to keep material consumption and the resulting environmental footprint, as well as transportation effort, low. In addition, such containers are also required to provide a high level of aesthetic appeal to consumers.

Polypropylene is a polyolefin (or polyalkene) compound and is derived from crude oil. Environmental, economic and sustainability questions are restricting the use of products derived from this limited resource. Therefore, there is a desire to identify more sustainable and effective materials that can be used to replace or partially replace the polyolefin component, whilst meeting the physical requirements discussed above.

The use of fillers to replace some of the thermoplastic material, or even to change the properties of thermoplastic materials, is known in the art. For example, carbon black is known to accelerate the degradation of polypropylene following exposure to UV light. Furthermore, various inorganic fillers have been used in combination with polyethylene—kaolin, mica, diatomite and talc, for example. These fillers tend to be economically affordable and widely available.

Injection moulding, described hereinafter, is a very commonly used process for manufacturing such containers. In conventional injection moulding processes the rate-limiting step of the moulding cycle is the cooling step, which correlates with the thickness of the moulded part. Energy is stored as heat across the gauge of the part and must be transferred into the mould during the cooling cycle. Hence parts with a lower surface area to volume ratio cool more slowly. Cooling time has a significant impact on the speed and hence production capacity of injection moulding equipment, ultimately translating into a greater number of production stations.

There is a need, therefore, for the provision of an improved process for making injection-moulded parts, which maintains the suitable physical properties of the resultant moulded parts, such as mechanical strength and resistance to temperature. In addition, the moulded part must have a low weight and good aesthetic properties. Also, there is a need for the materials from which the part is made to be economically and ecologically sound and to demonstrate sustainability.

SUMMARY OF THE INVENTION

In a first embodiment, the present invention relates to an injection moulded polymeric household bottle cap made of a polypropylene composition comprising:
from 3% to 17% particulate $CaCO_3$ by total weight of the composition;
from 0% to 6% additive by total weight of the composition; and,
qsp polypropylene;
wherein the polypropylene composition in its solid form and with average wall thickness T has a flexural modulus, measured according to ASTM D790-07, being at least 95% of the flexural modulus measured on a reference polypropylene composition substantially free of $CaCO_3$ and having average wall thickness of at least T+10%.

In a second embodiment the invention relates to packaging for a household product comprising: a container suitable for containing a household composition; an injection moulded polymeric household bottle cap as defined in the first embodiment, mounted onto said container and being suitable for sealing said container and for dispensing said household composition.

In a third embodiment, the invention relates to a household product comprising: a container; a household composition, contained in said container; an injection moulded polymeric household bottle cap as defined in the first embodiment, mounted onto said container.

In a fourth embodiment, the invention relates to the use of a bottle cap, as defined in the first embodiment, for providing a more sustainable and/or environmentally friendly household packaging compared to a reference polypropylene bottle cap being substantially free of $CaCO_3$.

In a fifth embodiment, the invention relates to a method of producing an injection moulded bottle cap, as defined in the first embodiment, comprising the steps of:
(a) providing a polypropylene composition in a molten form;
(b) injecting said polypropylene composition into a mould to form said bottle cap;
(c) cooling said polypropylene composition to solidify it;
(d) ejecting said bottle cap from the mould;
(e) preparing the mould for moulding the next bottle cap.

BRIEF DESCRIPTION OF THE DRAWINGS

An example of a bottle cap is depicted in FIGS. 1 to 4 in an open configuration.

DETAILED DESCRIPTION OF THE INVENTION

Figure 1:
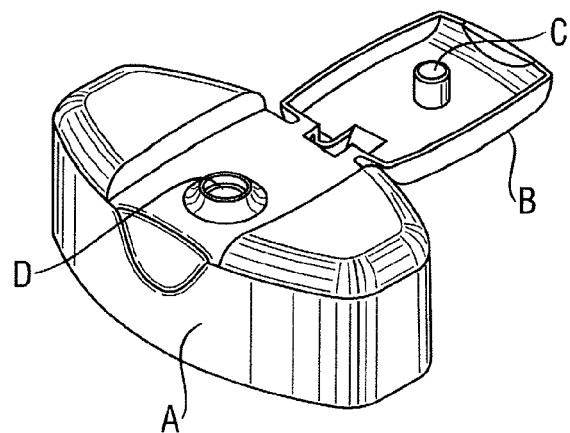
FIG. 1 shows a perspective view.
Figure 2:
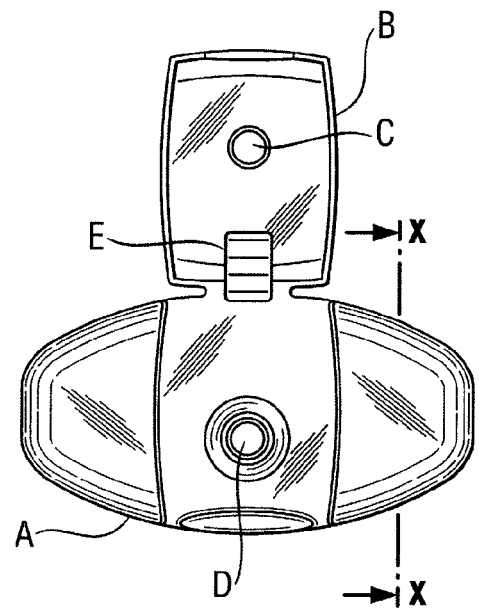
FIG. 2 shows the cap from above.
Figure 3:
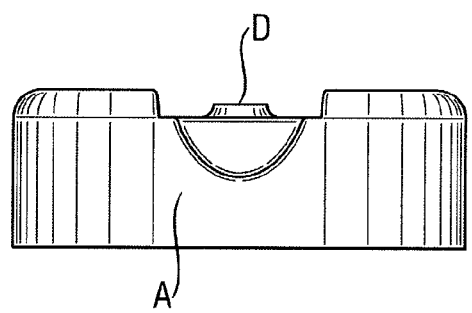
FIG. 3 shows a front elevation of the cap.

The inventors have surprisingly found that utilising a specific proportion of $CaCO_3$ particles in combination with polypropylene (also referred to as PP herein) results in a material with markedly improved mechanical properties. In particular, said material exhibits an improved flexural modulus. In the context of a bottle cap, the inventors have surprisingly found that said improved mechanical properties allow the average wall thickness of the bottle cap to be down-gauged. This enables desirable cap weight reduction, whilst maintaining said mechanical properties above the thresholds necessary for the cap to endure, with minimal damage, the required rigours, e.g. transportation and use. $CaCO_3$ has a whitening effect on parts and thus a lower amount of whitening agent e.g. $TiO_2$ is required. Also, PP comprising $CaCO_3$ wears injection moulding machinery more slowly than PP comprising $TiO_2$. Additionally, said material meets economic and sustainability questions. Furthermore, said material exhibits a density such that it floats in water, which allows normal bottle sorting to occur i.e. it does not require different, and hence undesirable, recycling methods, compared to conventional polypropylene. Moreover, the lower heat capacity and increased thermal conductivity of said material results in a reduced mould cycle time—the cooling process step can be shortened compared to the same injection moulding process using conventional polypropylene as a control/reference following injection into the mould.

As used herein, the terms: "substantially free of $CaCO_3$" means comprises less than 1%, preferably less than 0.5%, more preferably less than 0.1%, even more preferably 0%; "part" means a component portion of a final product.

All percentages are by weight unless otherwise stated.

In the first embodiment, the present invention relates to an injection moulded polymeric household bottle cap made of a PP composition comprising:
from 3% to 17% particulate $CaCO_3$ by total weight of the composition;
from 0% to 6% additive by total weight of the composition; and,
qsp PP;
wherein the PP composition in its solid form and with average wall thickness T has a flexural modulus, measured according to ASTM D790-07, being at least 95% of the flexural modulus measured on a reference PP composition substantially free of $CaCO_3$ and having average wall thickness of at least T+10%.

The present invention relates to an injection moulded polymeric household bottle cap made of a PP composition. PP is a thermoplastic polymer made from 1-propene monomers, which are derived from crude oil, and has a melting point of ~160° C. Suitable commercially available PPs include: grade PP 575-S from SABIC-KSA (Saudi Basic Industries Corporation, Kingdom of Saudi Arabia), Riyadh, Saudi Arabia; the homo-polymer European Moplen HP501L and the Moplen PP Random Copolymer RP340N, both from LyondellBasell Polymers, Houston, USA.

Said PP composition comprises particulate $CaCO_3$ (calcium carbonate). $CaCO_3$ is found naturally in various rocks and minerals, such as aragonite, calcite, vaterite, chalk, limestone, marble and travertine. The PP composition comprises from 5% to 14% $CaCO_3$, more preferably the PP composition comprises from 8% to 11% $CaCO_3$, by weight of the final composition. Said particulate $CaCO_3$ has a particle size of 2 to 4 μm. Particle size is commonly represented by the term $d_{50}$. A $d_{50}$ of 2 μm means 50% of the particles have a diameter of less than 2 μm. Using a particle size of above 4 μm is undesirable because larger particle sizes may result in the initiation of cracks in PP parts. A suitable commercially available $CaCO_3$ source as a filler for the present invention includes the granulated $CaCO_3$ product Omyalene® 102 M from Omya AG, Oftringen, Switzerland, which comprises 84% $CaCO_3$, 15% PP and ~1% stearic acid.

Said PP composition also comprises at least one additive. Said PP composition comprises from 0% to 6% additive, more preferably from 0% to 3% additive, by weight of the final composition. Additives may be selected from the group consisting of: impact modifiers; dispersants; fillers; filler coatings; foaming agents; processing agents; lubricants; particles; dyes and colorants; UV filters; anti-static agents; and mixtures thereof. When particles are used as additives, said particles are different from particulate $CaCO_3$ as defined above. Additives used in the PP composition according to the present invention are conventional additives i.e. present in a conventional PP carrier mix. Particles may be used e.g. Expancel® microspheres from Akzo Nobel, Essen, Germany, and/or foaming agents e.g. Hydrocerol® from Clariant, Frankfurt-Höchst, Germany. Furthermore, different fillers may be utilised in addition to $CaCO_3$, for example kaolin, carbon black, mica, silica, diatomite, nano-particle clays, cellulose fibre, wood fibre, powdrous wood or china grass, rice spelt, starch and talc. With the addition of such additives the process may achieve further benefits such as increased displacement of PP resin, increased cycle time reduction, no yellowing side effects, and better part integrity.

The PP composition in its solid form and with average wall thickness T has a flexural modulus, measured according to ASTM D790-07, of at least 95% of the flexural modulus measured on a reference PP composition substantially free of $CaCO_3$ and having average wall thickness of at least T+10%. ATSM stands for American Society for Testing and Materials, which is now known as ATSM International. The flexural modulus can be measured using ASTM D790-07, which is a standard test method for flexural properties of unreinforced and reinforced plastics and electrical insulating materials by three-point bending.

Figure 4:
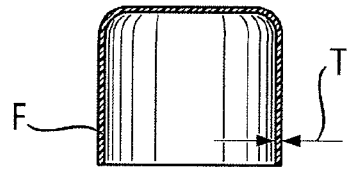
FIG. 4 depicts a cross-section across line X shown on FIG. 2.

Average wall thicknesses of bottle caps can be measured with a caliper device. FIG. 4 shows the average wall thickness of a bottle cap, wherein the wall of the cap is shown as a cross-hatched portion (F), which has an average wall thickness (T). In an embodiment, the bottle cap has an average wall thickness T of at least 10% lower than the average wall thickness of a reference polypropylene bottle cap substantially free of $CaCO_3$. More preferably the average wall thickness T is reduced by at least 20%. In an embodiment, the bottle cap has a average wall thickness T of preferably from 0.5 mm to 10 mm, more preferably 0.5 mm to 1.5 mm.

In an embodiment, the polypropylene composition in its solid form has a compression stability, measured according to ASTM D2659, of at least 10% higher than compression stability of a reference PP composition substantially free of $CaCO_3$. The compression stability can be measured using ASTM D2659, which is a standard test method for column crush properties of blown thermoplastic containers.

According to the present invention the PP composition preferably exhibits a reduced specific heat capacity compared to a reference PP composition substantially free of $CaCO_3$. The specific heat capacity of a material can be measured by modulated temperature differential scanning calorimetry, e.g. ASTM WK 12876.

Also preferably, the PP composition exhibits an increased thermal conductivity compared to reference PP composition substantially free of $CaCO_3$. Thermal conductivity can be measured by e.g. ASTM Standard D5930-01, a standard test method for thermal conductivity of plastics by means of a transient line-source technique.

Typical density, thermal conductivity and heat capacity values for PP and calcite ($CaCO_3$) are shown in Table I below.

TABLE I

|  | Polypropylene | Calcite |
|---|---|---|
| Density (g · cm$^{-3}$) | 0.92 | 2.7 |
| Heat conductivity (W · m$^{-1}$ · K$^{-1}$) | 0.1-0.22 | 1.5-4 |
| Heat capacity (J · K$^{-1}$ · kg$^{-1}$) | 1700-1900 | 700-900 |

PP items are commonly desired to be recycled. A typical method of recycling such items involves shredding and subsequent floatation sorting via density relative to water. PP floats in water whereas some other plastics sink. Preferably, the PP composition according to the present invention still exhibits a density such that it floats in water, which allows normal bottle sorting to occur i.e. it does not require different, and hence undesirable, recycling methods, compared to PP without CaCO$_3$.

The present invention relates to an injection moulded polymeric household bottle cap. Conventional bottle caps comprise a main body portion, an orifice and a closure, but vary in sizes and dimensions. FIGS. 1 to 4 show a typical flip top bottle cap, which is known from Procter & Gamble Company products e.g. Pantene®. As shown in FIGS. 1 to 4, the flip top bottle cap, made from a PP composition according to the present invention, comprises a receiving portion (A); a hinged sealing portion (B); a sealing portion (C); a dispensing portion (D); and a hinge (E).

According to the present invention, the bottle cap meets performance test requirements such that it is able to withstand the rigours of transportation and use, e.g. cap opening force, pull off force, leak resistance, hinge flex, impact resistance, stress crack resistance, fade resistance, and resistance to the product contained within the bottle.

In an embodiment, the PP composition is stable over a period of time of at least 6 months, preferably from 12 to 24 months, when exposed to a temperature from 25 to 45° C., a relative humidity from 20% to 60%, and exposure to light of 2700 Kelvin to 3300 Kelvin. Exposure to light is measured by the correlated colour temperature.

More preferably the bottle cap or closure is suitable for sealing a container comprising a household composition and for dispensing said household composition. Household compositions may be selected from the group consisting of: personal care compositions, cleansing compositions, fabric care compositions, and homecare compositions. Said household composition is preferably a personal care composition, more preferably a hair care composition. Hair care compositions may comprise any suitable hair care agents, preferably hair care agents selected from the group consisting of hair conditioning agents, hair styling agents, perming and waving agents, hair cleansing agents, hair colouring, dyeing agents, bleaching agents, hair shine or gloss imparting agents, and mixtures thereof.

In a second embodiment the invention relates to packaging for a household product comprising: a container suitable for containing a household composition; an injection moulded polymeric household bottle cap as defined in the first embodiment, mounted onto said container and being suitable for sealing said container and for dispensing said household composition. Typical household compositions are defined above.

In a third embodiment, the invention relates to a household product comprising a container; a household composition, contained in said container; an injection moulded polymeric household bottle cap as defined in the first embodiment, mounted onto said container. Typical household compositions are defined above.

In a fourth embodiment, the invention relates to the use of a bottle cap, as defined above, for providing a more sustainable and/or environmentally friendly household packaging compared to a reference PP bottle cap being substantially free of CaCO$_3$.

In a further embodiment, the household product forms part of a kit. The kit may comprise the packaging as described above; a label for the container; further packaging items; and/or a plurality of household products. The kit may be assembled within a package, e.g. shrink wrapping, a box. The kit may comprise instructions comprising information and directions on to prepare, use, and/or apply the household product composition. The instructions may further include one or more illustrations.

In a fifth embodiment, the invention relates to a method of producing an injection moulded bottle cap, as defined in the first embodiment, comprising the steps of: providing a polypropylene composition in a molten form; injecting said polypropylene composition into a mould to form said bottle cap; cooling said polypropylene composition to solidify it; ejecting said bottle cap from the mould; preparing the mould for moulding the next bottle cap.

Injection moulding is a commonly used process for the manufacture of household items. Often blow moulding is used for containers and injection moulding is used for smaller and more complex parts such as bottle caps. Conventional injection moulding processes comprise the steps: injecting molten thermoplastic material (such as PP) into a mould to form the derived part; cooling said thermoplastic material (PP) long enough for it to solidify; opening the mould to allow access and ejection of the solidified part; closing the mould for the next cycle. More specifically, the process firstly involves injecting a molten thermoplastic composition into a cavity formed in a so-called mould, which consists of at least two pieces capable of being opened to release the solidified piece formed as a negative version of the cavity. A mould is also sometimes referred to as a die. After injection, the plastic is allowed to cool (usually actively cooled) and hence solidify. Then typically the mould is opened and the moulded part is ejected or removed from the mould. The mould then closes in preparation for the next cycle.

According to an embodiment of the present invention the time of the cooling step is shortened by at least 1.5% compared to said process using a reference PP composition substantially free of CaCO$_3$. For the purposes of this application, the cooling time starts when the injection step is complete and ends when the bottle cap has been ejected i.e. when the injection step (b) is complete and ends when the part has been ejected (step [d]). Preferably the cooling step is shortened by at least 10%, more preferably by at least 25%. Furthermore, the cooling step is shortened by at least 1 s, more preferably by at least 2 s, even more preferably by at least 3 s.

EXAMPLES

The following examples further describe and demonstrate the preferred embodiments within the scope of the present invention. The examples are given solely for the purpose of illustration, and are not to be construed as limitations of the present invention since many variations thereof are possible without departing from its scope.

Figure 5:
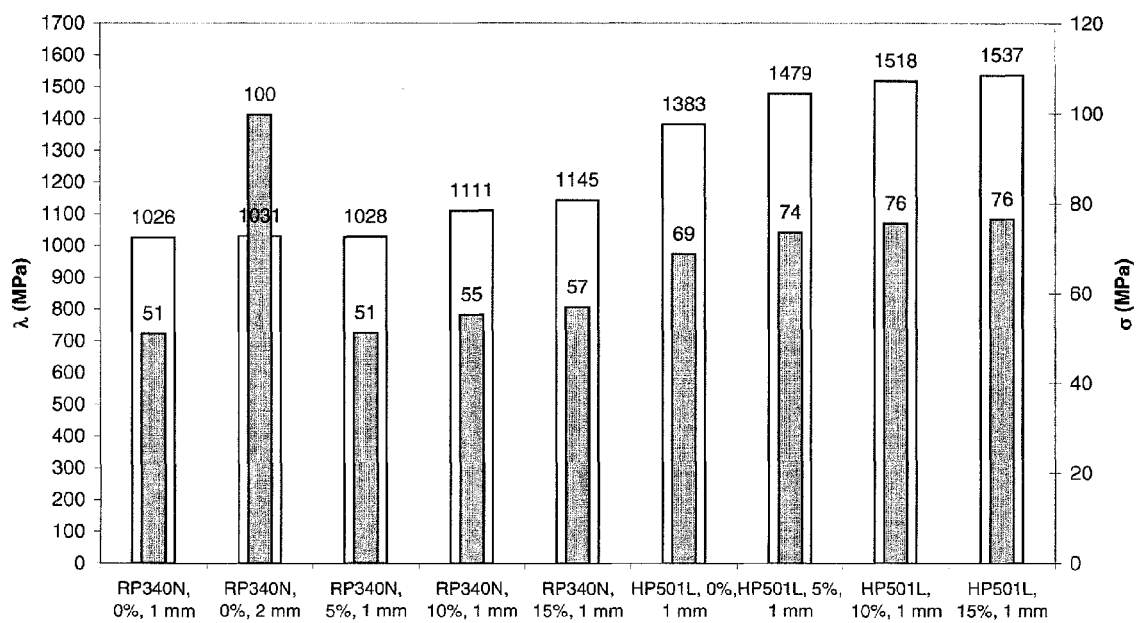
FIG. 5 shows flexural modulus ($\lambda$) and stress ($\sigma$) values for polypropylene compositions comprising varying amounts of Omyalene® 102 M ($CaCO_3$).

FIG. 5 shows the mechanical data resulting following measurement of the flexural modulus via test method ASTM D790-07 for PP compositions comprising varying percentages of Omyalene® 102 M (84% CaCO$_3$) i.e. 0%, 5%, 10% and 15%. Two different PP resins were compared, Moplen HP501L and Moplen RP340N. The lighter coloured bars show the flexural modulus (λ) data and the darker coloured bars the stress (σ) data, which was calculated as described below.

To calculate flexural strain ($\epsilon_f$) for a sample:

$$\epsilon_f = (6 \cdot D \cdot d)/L^2 \quad (I)$$

Where D is displacement, d is thickness, and L is length of span. For FIG. 5, D is 5 mm and L is 25.4 mm. For all bars, the thickness of the sample was 1 mm, except the second set of bars, which used a 2 mm thick sample, as indicated. The stress (σ) and flexural strain ($\epsilon_f$) are linked to flexural modulus (λ) in the following relationship:

Flexural Modulus=Stress/Flexural Strain $$\lambda = \sigma/\epsilon_f \quad (II)$$

Therefore:

Stress=Flexural Modulus×Flexural Strain $$\sigma = \lambda \cdot \epsilon_f \quad (III)$$

Substituting flexural strain from formula I into formula III, the stress a sample can withstand can be calculated. FIG. 5 shows the stress increases with increasing percentage of $CaCO_3$ in the PP composition due to increased flexural modulus.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection moulded polymeric household bottle cap made of a polypropylene composition comprising:
   about 10% particulate $CaCO_3$ by total weight of the composition;
   from about 0% to about 6% additive by total weight of the composition; and
   polypropylene;
   wherein the polypropylene composition in its solid form and with average wall thickness T has a flexural modulus being at least about 95% of the flexural modulus measured on a reference polypropylene composition substantially free of $CaCO_3$ and having average wall thickness of at least about T+10%; and
   wherein the bottle cap has an average wall thickness from 0.5 mm to 10 mm;
   and
   wherein the polypropylene composition is recyclable.

2. A bottle cap, according to claim 1, wherein the polypropylene composition in its solid form has a compression stability of at least about 10% higher than compression stability of a reference polypropylene composition substantially free of $CaCO_3$.

3. The bottle cap, according to claim 1, wherein the polypropylene composition is stable over a period of time of at least 6 months when exposed to a temperature from about 25 to about 45° C., a relative humidity from about 20% to about 60%, and exposure to light of about 2700 Kelvin to about 3300 Kelvin.

4. The bottle cap, according to claim 1, wherein said polypropylene composition comprises from about 0% to about 3% additive, by weight of the final composition.

5. The bottle cap, according to claim 1, wherein additive is selected from the group consisting of impact modifiers, dispersants, filler coatings, foaming agents, processing agents, lubricants, particles, dyes and colorants, UV filters, anti-static agents, and mixtures thereof.

6. The bottle cap, according to claim 1, wherein said cap is suitable for sealing a container comprising a household composition and for dispensing said household composition.

7. The bottle cap, according to claim 1, comprising a dispensing orifice, a receiving portion, and hinged sealing portion.

8. The bottle cap, according to claim 1, wherein the bottle cap has an average wall thickness T of at least about 10% lower than the average wall thickness of a reference polypropylene bottle cap substantially free of $CaCO_3$.

9. The bottle cap, according to claim 1, wherein the bottle cap has an average wall thickness T is reduced by at least about 20% than the average wall thickness of a reference polypropylene bottle cap substantially free of $CaCO_3$.

10. The bottle cap, according to claim 1, having an average wall thickness from about 0.5 mm to about 1.5 mm.

11. The bottle cap, according to claim 1, said particulate $CaCO_3$ has a particle size of about 2 to about 4 μm.

12. The bottle cap, according to claim 1, wherein the polypropylene composition comprises microspheres and/or foaming agents.

13. Packaging for a household product comprising:
   a container suitable for containing a household composition;
   an injection moulded polymeric household bottle cap according to claim 1, mounted onto said container and being suitable for sealing said container and for dispensing said household composition.

14. A household product comprising:
   a container;
   a household composition, contained in said container;
   an injection moulded polymeric household bottle cap according to claim 1, mounted onto said container.

15. The household product, according to claim 14, wherein said household composition is selected from the group consisting of personal care compositions, cleansing compositions, fabric care compositions, homecare compositions, and combinations thereof.

16. A household product, according to claim 15, wherein said household composition is a hair care composition comprising a component selected from the group of hair conditioning agents, hair styling agents, perming and waving agents, hair cleansing agents, hair colouring, dying or bleaching agents, hair shine or gloss imparting agents, and mixtures thereof.

* * * * *